United States Patent [19]

Hansen et al.

[11] 4,099,982

[45] Jul. 11, 1978

[54] METHOD OF EVAPORATING AND SPRAY DRYING OF A SUCROSE SOLUTION

[75] Inventors: Ove Hansen, Vaerløse; Stig Rasmussen, Gadstrup, both of Denmark

[73] Assignee: A/S Niro Atomizer, Soborg, Denmark

[21] Appl. No.: 847,366

[22] Filed: Oct. 31, 1977

[30] Foreign Application Priority Data

Nov. 1, 1976 [DK] Denmark .............................. 4935/76

[51] Int. Cl.² .............................................. C13F 1/02
[52] U.S. Cl. ........................................ 127/61; 127/16;
159/4 S; 159/4 VM; 426/471
[58] Field of Search ........................ 127/61, 15, 58, 16,
127/63; 426/471, 519; 159/10, 11 R, 118, 4 R, 4
VM, 4 S, 9 A, 16 R, 45

[56] References Cited

U.S. PATENT DOCUMENTS

| 3,582,399 | 6/1971 | Black ................................. 127/61 X |
| 3,706,599 | 12/1972 | Woodruff et al. ................ 127/58 X |

FOREIGN PATENT DOCUMENTS

| 1,240,691 | 7/1971 | United Kingdom. |
| 1,094,932 | 12/1967 | United Kingdom. |

*Primary Examiner*—Kenneth M. Schor
*Attorney, Agent, or Firm*—Sughrue, Rothwell, Mion, Zinn and Macpeak

[57] ABSTRACT

An aqueous sucrose solution is evaporated continuously while being subject to vigorous mechanical agitation to produce a sucrose suspension which is spray dried immediately, after which the spray dried product is post-crystallized and post-dried. A complete recovery is obtained of the sucrose present in the solution, in a process which is simple and economical since injection of sucrose crystals in the drying gas in the spray drier is omitted.

2 Claims, 1 Drawing Figure

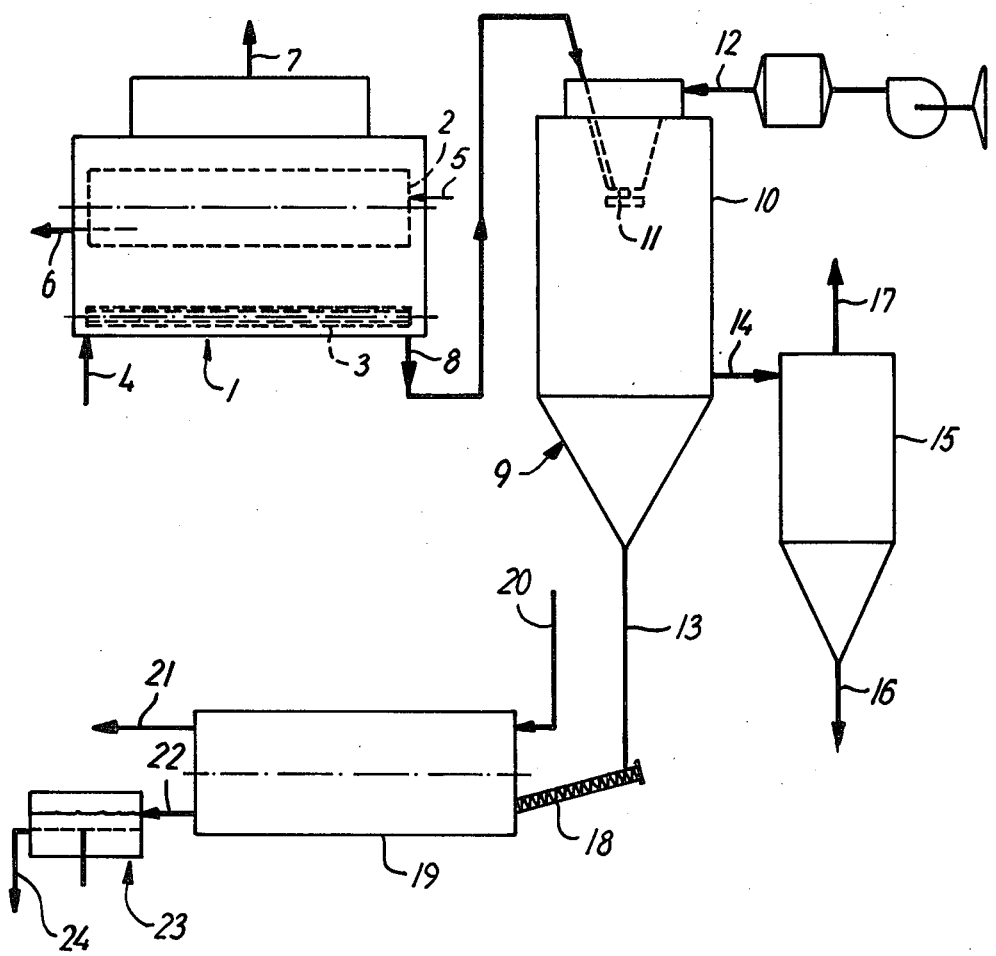

METHOD OF EVAPORATING AND SPRAY DRYING OF A SUCROSE SOLUTION

FIELD OF THE INVENTION

In the conventional production of sucrose on the basis of sugar beets or sugar canes, sucrose is recovered by fractional crystallization from a sucrose solution containing certain impurities.

Thus, this fractional crystallization has inter alia for its purpose to separate sucrose from said impurities.

However, protracted heating of the impure sucrose solution, which is required for performing said fractional crystallization, results in inversion of part of the sucrose. The glucose and fructose produced by said inversion cannot be directly caused to crystallize but pass into the molasses, which is a product of less value.

Further, the yield is reduced by the fact that part of the sucrose cannot be caused to separate from the molasses in crystalline form. Consequently there will be up to 10–15% of the sucrose present in the original solution that cannot be recovered in crystalline form.

Moreover the production of sucrose by crystallization requires the use of complicated and labour-consuming equipment such as vacuum pans, crystallizers, centrifugal machines and drum driers.

Consequently, there is a need for a process of recovering sucrose from solutions thereof produced from sugar beets or sugar canes, which process does not comprise fractional crystallization, but is based on drying the total amount of solution. By using such process it will be possible to achieve not only the advantage that the extent of inversion will be considerably smaller, but also the advantage that the limited amount of invert sugar that might be produced or might already be present in the sucrose solution, does not pass into the molasses but is recovered together with the sucrose without any deteriorating effect on the quality of the sucrose. A point of greater importance is that the quantity of sucrose that otherwise would pass into the molasses, will be extracted in crystalline form where its sales value is approximately three times higher than the value of the same quantity of sucrose dissolved in molasses. Furthermore, it will be possible to perform this process with less complicated equipment and manpower. A condition for a process of drying the total amount of solution being applied when recovering sucrose from solutions of said origin, is of course that the solutions can be purified by methods so effective as to permit the total content of dry matter therein contained of being transferred to the sucrose.

Such effective purification methods, which inter alia are based on ion-exchange processes, are as a matter of fact at disposal today but the problems attached to the performance of an expedient drying of the purified solutions are of such order that, in spite of the great advantages attached to sucrose recovering methods based on drying of the solutions, they have still not acquired industrial significance.

BACKGROUND OF THE INVENTION

If sucrose solutions of such concentrations as may may come in consideration in conjunction with the production of sucrose on an industrial scale, are subjected to spray drying without taking special precautions, the sucrose will be supercooled and the resulting product is an incompletely crystallized substance which adheres to the walls of the spray drier.

However, it is known from British Specification No. 1,191,908 that grains of crystalline sugar can be obtained by spray drying a massecuite obtained by cooling-crystallization of a sucrose solution. The performance of such cooling-crystallization is, however, very time-consuming (from 3 to 6 hrs) and requires, therefore, equipment of considerable dimensions. Moreover, in conjunction with this method there occurs a certain loss of heat since not only the free heat within the solution but also the crystallization heat liberated, cannot be utilized but is carried away with the coolant.

British Specification No. 1,072,816 discloses an agglomeration method where a suspension of particles is spray dried in a liquid containing binding agent, for the purpose of producing a granular product where the individual grains consist of a plurality of particles cemented together by a relatively small amount of binding agent. The particle suspension spray dried is produced either by cooling-crystallization or by adding particles to a liquid. In either case the suspension contains so many particles that up to 90% or above of the substance in question is in particle form, and the primary object is to cement the fine particles together to form larger grains. The examples contained in the Specification do only prove the applicability of the method in conjunction with particles of lactose or fumaric acid and with a binding agent of lactose, glucose or fumaric acid, and on the basis thereof it is not possible to draw any conclusions as to the applicability of the method in conjunction with sucrose, and particularly not because it is known inter alia from the below-mentioned British Specification No. 1,240,691, that sucrose solutions are more sticky and difficult to spray dry than other sugars, such as glucose. To this is added that the person skilled in the art has felt no urge to investigate the possible applicability of the method in conjunction with the recovering of sucrose on an industrial scale since, as mentioned, the method comprises either the addition of an extremely large amount of fine particles to the solution to be dried, or the use of a complex and time-consuming cooling-crystallization for obtaining the required amount of crystals in the suspension.

Furthermore, it is known from British Specification No. 1,282,878 to spray dry sucrose solutions by injecting sucrose particles dispersed in air into the cloud of atomized sucrose solution within the spray drier, and these sucrose particles may consist of recycled material. However, the injection of solid particles dispersed in air into the spray drier involves certain practical drawbacks, and to ensure that practically all atomized liquid droplets, while suspended in air, get into sufficient contact with solid particles, it will be necessary to inject a substantially greater number of solid particles in excess of those actually getting into contact with the droplets, for which reason the number of solid particles must be very large. The injection of this large amount of particles requires considerably volumes of air, for which reason the heat economy of the drying process is highly deteriorated when using this arrangement.

A modification of this method is object of British Specification No. 1,387,062. In this method a very great number of the sucrose particles produced are recycled to the spray drier so that said particles are distributed along the outer periphery of the drying zone. The result hereof, it is alleged, is that a free-flowing dry product can be discharged directly from the spray drier, and that the problems with sucrose deposits on the spray drier walls are diminished. However, this method is also encumbered with the shortcomings referred to in connection with the process disclosed in British Specification No. 1,282,878.

British Specification No. 1,240,691 refers to a method where, in addition to the injection of sucrose crystals into the drying air, sucrose crystals are also admixed to the solution to be spray dried. Also this method is of course encumbered with the shortcomings referred to in connection with British Specification No. 1,282,878.

SUMMARY OF THE INVENTION

This invention relates to a method of evaporating and spray drying a sucrose solution, where the shortcomings of the methods referred to above, are avoided.

The method according to the invention is characterised in evaporating the sucrose solution continuously while subjecting it to vigorous mechanical agitation, to produce a suspension of sucrose crystals in sucrose solution without any substantial recycling of sucrose crystals to the solution being evaporated, and then spray drying said suspension without any preceding cooling-crystallization to achieve a meterial resembling wet snow and having a moisture content of between 0.5 and 5% by weight, and post-crystallizing and post-drying said material.

It has as a matter of fact surprisingly turned out that when spray drying a suspension of sucrose crystals in sucrose solution obtained by evaporating a sucrose solution as stated, the resulting product will be a material resembling wet snow, also even if there is no injection of solid particles dispersed in air into the spray drier.

The sucrose resembling wet snow resulting from the spray drying will initially settle on the walls of the drying chamber. When a layer of certain thickness has built up, it will, however, inter alia as a consequence of initial crystallization, loosen by itself from the wall of the chamber and fall down into the discharge opening at the bottom of the chamber. If it be desired to speed up the removal of the material from the walls of the chamber, a beating device may in a manner known per se be attached to the outside of said walls. Thus, no problems are caused by adherence of the product to the walls of the chamber.

The fact that it is thus possible to omit the time-consuming cooling-crystallization prescribed in the above-quoted British Specification Nos. 1,072,816 and 1,191,908 is very surprising, in that such procedure has heretofore been considered a necessity, and it was to be expected that problems similar to those occurring in conjunction with the spray drying of a sucrose solution without the presence of crystals, would arise, i.e. that a sticky material would be produced as a consquence of supercooling.

The moisture contained in the material taken out from the spray drier depends on the equipment used and the drying conditions, incl. particularly the temperature and volume of drying air, and, as stated, it amounts to between 0.5 and 5% by weight, typically between 1 and 2% by weight.

The material discharged from the spray drier is after-treated for the purpose of letting the crystallization initiated in the spray chamber go entirely or approximately to completion, and of drying the sucrose to the desired value for the final product, i.e. to max. a water content of 0.1% by weight.

This after-treatment may be carried out as a two-step operation by first post-crystallizing the sucrose resembling wet snow for e.g. 10-20 minutes and then drying.

However, the after-treatment may also be carried out in a single step, so that post-crystallization and drying are effected within the same unit, for example in a drum drier to which the sucrose is fed directly from the spray drier. Expediently, the product is first post-crystallized and dried to a mositure content of for example 0.5% in a drum drier, whereupon the final drying to a moisture content of below 0.1% is effected in a vibrated, fluid bed (in a so-called "Vibro-fluidizer").

After screening, the sucrose resulting from the conditioning step is a free-flowing fine powder. Lumps retained by the screen may for example be re-dissolved in the sucrose solution to be evaporated.

In a preferred embodiment of the method according to the invention evaporation is carried out continuously in a vacuum evaporator known per se and of the type which, inside a casing, is provided with a substantially horizontally disposed, internally heated rotary cylinder which at least over part of its length is provided with longitudinally extending corrugations, the solution being sprayed on the cylinder over a substantial part of its length from a sump below the cylinder within said casing, and the solution is fed to the casing at a location which, viewed in the longitudinal direction of the cylinder, is spaced apart from the location where non-evaporated consituents are taken out of the casing.

Such apparatus is known from British Specification No. 1,094,932.

The solution contained in the sump is sprayed on to the cylinder preferably by means of a rotor located below and substantially parallel to said cylinder, the rotor comprising members which extend downwards into the sump and splash the solution therein contained on to said cylinder. The effect of this rapid rotation of the rotor is that the solution and the suspension obtained by evaporation of said solution are subjected to vigorous mechanical agitation and, moreover, the apparatus is so constructed that recycling of crystal suspension to solution fed at a later time takes place to a minor degree. These two circumstances have the effect that sucrose crystallization to a smaller degree takes place as a growth of recycled crystals, but predominantly as a new-formation of crystals, for which reason the suspension obtained contains small but, in view of their proportional weight, numerous crystals. This is assumed to be reason why the suspension obtained can be spray dried directly.

When using an apparatus like the one forming the subject matter of British Specification No. 1,094,932 in conjunction with the method according to the invention, it is expedient to introduce crystalline sucrose as a seeding material at the upstart of the apparatus but once the continuous crystal formation is going on in the apparatus, further supplies of seeding material is superfluous.

Typically, the evaporation is performed with a view to obtaining a sucrose content in the suspension of about 80% by weight, of which approx. 33% by weight, calculated on the weight of the suspension, corresponding to approx. 41% by weight of the total sucrose quantity, will be present in the form of crystals, and the residual approx. 47% by weight, calculated on the weight of the suspension, will be present in solution with concentration of approx. 70% by weight.

In the method of the invention the evaporation has for its aim to provide a suspension with as small crystals as possible, and the average size of the crystals will preferably be below 10 microns.

Whether the sucrose suspension has been evaporated sufficiently for being spray dried without producing a sticky product that adheres to the walls of the spray drier depends both on the quantity and size of the crystals, and is in practice determined by the following test: A few drops of the suspension are caused to form a thin film on a glass plate, and the glass plate is then placed in a flow of hot air produced by a hair drier. The temperature of the airflow must be approximately the same as the outlet temperature to be used for the drying gas in the spray drier. After approx. 1 minute it is checked whether the suspension has solidified without sticking. If so, the suspension is ready for spray drying, and in the opposite the suspension must be further evaporated.

The spray drying process applies a drying gas inlet temperature of up to 260° C and above, for example 180° C, and an outlet temperatur of for example 85° C.

It goes without saying that this method is not limited to the application of sucrose solutions obtained directly by purification and, if necessary, concentration of sugar beet of sugar cane juice, but may also be applied to drying of solutions consisting of purified fractions of molasses. It has turned out that the use of this method does not result in any significant sucrose inversion.

Further, this invention relates to a plant for performing the preferred embodiment of the method according to the invention, said plant being characterised in comprising a vacuum evaporator known per se which, inside a casing, is provided with a substantially horizontally disposed, internally heated rotary cylinder provided at least over part of its length with longitudinally extending corrugations, and which below the cylinder, inside the casing, is provided with a sump comprising means for splashing solution from said sump onto the cylinder, said vacuum evaporator further comprising inlet means for feeding solution to said casing and, spaced apart from said inlet means, viewed in the longitudinal direction of said cylinder, means for taking out the suspension from said casing, a spray drier, preferably comprising a rotary atomizer, known per se, and a conditioning installation known per se.

The invention will be further illustrated with references to the accompanying drawing which, in definite schematic form shows an embodiment of the method and plant according to the invention.

This plant comprises a vacuum evaporator 1 of the type described in British Specification No. 1,094,932. This evaporator comprises a slowly rotating corrugated cylinder 2 and, below said cylinder, a rapidly rotating rotor 3 comprising means for splashing liquid on to said cylinder.

The sucrose solution, if desired pre-concentrated in another apparatus is in the embodiment shown fed to one end of the apparatus via line 4, and by means of the rapidly rotating rotor 3 splashed onto the underside of cylinder 2. This cylinder is corrugated at least at the end facing supply line 4, and this results in a number of advantages as explained in said British Specification.

The interior of said cylinder is supplied with steam via line 5, and water resulting from the condensation of said steam, is discharged via line 6. The vapours produced by the evaporation of the solutions are exhausted via line 7 and may serve as a source of heat.

While flowing through evaporator 1 the sucrose solutios is continuously splashed onto the underside of cylinder 2 by rotor 3. The major evaporation takes place on the surface of the cylinder, and when the sprayed-on solution has remained on the surface of the cylinder during one revolution thereof, its concentration has consequently increased. At this time the more concentrated solution is again splashed off the cylinder surface by sucrose solution splashed onto the cylinder by the rotor, and flows back to the sucrose solution or suspension at the bottom of the apparatus.

While flowing through the evaporator the concentration of the solution increases to an extent where separation of crystals takes place, and these crystals will be numerous and small, for one thing as a consequence of the heavy mechanical agitation to which the solution is exposed, and for another as a consequence of the fact that on account of the structure of the evaporator recycling of crystals to the solution being evaporated takes place only on a very small scale.

The suspension obtained is directed via line 8 to spray drier 9. It may, of course, be expedient for operational reasons to install a small reservoir in line 8, but such reservoir is not required for performing the principle of the invention since the suspension removed from evaporator 1 permits of being spray dried directly.

The spray drier comprises a drying chamber in container 10 in which provision has been made for a rotary atomizer wheel 11.

Filtered and heated drying gas is supplied to the spray chamber via line 12. The sucrose resembling wet snow which is produced by drying the atomized suspension is partly removed via a powder outlet 13 at the bottom of container 10, and partly carried along with the spent drying air via line 14 to cyclone 15, wherein the sucrose powder is separated from the drying air and leaves the cyclone via powder outlet 16 at the bottom thereof. The air leaves the cyclone via line 17 at the top thereof.

Sucrose removed via powder outlet 13 which has not so far finally crystallized and contains moisture in excess of that desired in the final product, is received by conveying member 18, for example a worm or belt conveyor. This conveying member takes the sucrose to a conditioning installation which, in the embodiment shown, is drum drier 19.

Air at room temperature is blown through the drum drier as shown at air inlet 20 and air outlet 21. Drum drier 19 has such dimensions that the average residence time of sucrose is between 10 and 30 minutes. When sucrose is removed via powder outlet 22, crystallization has substantially finished, and the moisture content has been considerably reduced. The sucrose is via line 22 directed to a "Vibro-fluidizer" 23 where it first passes through a zone, through which hot air is blown, and then, if desired, through a second zone, through which unheated air is blown, whereupon sucrose is removed via line 24 suitably cooled and with a moisture content of less than 0.1% by weight. If the purpose for which the sucrose is to be used so requires, the sucrose may then be screened and/or (if necessary) ground to form the desired powder. Normally, the product removed through powder outlet 16 requires no post-drying.

The invention will be further illustrated by means of the below example.

EXAMPLE

The starting material used was a solution containing 50% by weight of sucrose and produced by ion-exchange and evaporation of sugar beet juice.

This solution was treated in an installation more or less like the one shown in the drawing.

In the evaporator 1 a pressure of 60 mm Hg was maintained, and the pressure of the vapour supplied through pipe 5 was 4 atm. Cylinder 2 rotated at a speed of 35 rpm, and the rotor rotated at 960 rpm.

The suspension leaving evaporator 1 through pipe 8 had a total sucrose concentration of 81 to 85% by weight.

Evaporator 1 had a heating transferring surface of 12 m$^2$, and the solution supplied amounted to 300 kg per hour.

The suspension achieved was fed directly to a spray drier having a diameter of 2.65 m and a height of 2 m. The atomizer wheel had a diameter of 120 mm and rotated at 15000 rpm.

The drying air supplied had an inlet temperature of 180° C and an outlet temperature of 85° C.

The sucrose removed through powder outlet 13 had a water content of 1.5% by weight and was transferred to a belt conveyor and there retained for 10 minutes, whereafter it was dried in a "Vibro fluidizer" by drying air having a temperature of 110° C. Here it was retained for 20 minutes. The resulting product was a free-flowing powder having a moisture content of less than 0.1%. The invert sugar content was determined in the starting solution and in suspension leaving the evaporator as well as in the final product. By these determinations it was not possible to demonstrate that any inversion of sucrose had taken place, neither in the evaporator nor in the spray drier or in the final drying.

What we claim is:

1. A method of evaporating and spray drying a sucrose solution, comprising evaporating the sucrose solution continuously while subjecting it to vigorous mechanical agitation, to produce a suspension of sucrose crystals in sucrose solution, spray drying in a spray drier said suspension without any preceding cooling-crystallization to achieve a material resembling wet snow and having a moisture content of between 0.5 and 5% by weight, wherein there is no recycling of sucrose crystals to the spray drier, and post-crystallizing and post-drying said material.

2. A method as claimed in claim 1, wherein the evaporation is carried out continuously in a vacuum evaporator of the type which, inside a casing, is provided with a substantially horisontally disposed internally heated rotary cylinder which at least over part of its length is provided with longitudinally extending corrugations, the solution being sprayed onto the cylinder over a substantial part of its length from a sump below the cylinder within the casing, and the solution is fed to the casing at a location which, viewed in the longitudinal direction of said cylinder, is spaced apart from the location where non-evaporated constituents are removed from the casing.

* * * * *